United States Patent
Matosevich et al.

(10) Patent No.: US 12,229,433 B2
(45) Date of Patent: Feb. 18, 2025

(54) STORAGE SYSTEM INTERFACE DISCOVERY WITH LIMITED NUMBER OF PERSISTENT HOST DISCOVERY CONNECTIONS

(71) Applicant: Dell Products L.P., Round Rock, TX (US)

(72) Inventors: Rivka Mayraz Matosevich, Zichron Ya'acov (IL); Ziv Dor, Rishon Letzion (IL)

(73) Assignee: Dell Products L.P., Round Rock, TX (US)

(*) Notice: Subject to any disclaimer, the term of this patent is extended or adjusted under 35 U.S.C. 154(b) by 482 days.

(21) Appl. No.: 17/726,008

(22) Filed: Apr. 21, 2022

(65) Prior Publication Data

US 2023/0342069 A1    Oct. 26, 2023

(51) Int. Cl.
    G06F 3/00        (2006.01)
    G06F 3/06        (2006.01)

(52) U.S. Cl.
    CPC .......... G06F 3/0655 (2013.01); G06F 3/0604 (2013.01); G06F 3/0679 (2013.01)

(58) Field of Classification Search
    CPC ..... G06F 3/0655; G06F 3/0604; G06F 3/0679
    See application file for complete search history.

(56) References Cited

U.S. PATENT DOCUMENTS

| | | | | |
|---|---|---|---|---|
| 2015/0282229 A1* | 10/2015 | Vedula | .................. | H04W 76/14 370/338 |
| 2019/0042144 A1* | 2/2019 | Peterson | ................ | G06F 3/0635 |
| 2020/0136996 A1* | 4/2020 | Li | ....................... | G06F 12/1081 |
| 2021/0034270 A1* | 2/2021 | Gupta | ................. | G06F 13/1668 |

OTHER PUBLICATIONS

Friend, Tom; "Discovery Automation for NVMe-oF IP-Based SANs Q&A", https://sniansfblog.org/a-qa-on-discovery-automation-for-nvme-of-ip-based-sans/, dated Nov. 22, 2021; downloaded on Apr. 6, 2022.
Friend et al., "NVMe-oF: Discovery Automation for NVMe IP-based SANs", 2021 Storage Industry Association, dated Nov. 4, 2021.
"SmartFabric Storage Software", 2022 Dell Inc. or its subsidiaries; downloaded on Apr. 6, 2022.

* cited by examiner

*Primary Examiner* — Craig S Goldschmidt
(74) *Attorney, Agent, or Firm* — Ryan, Mason & Lewis, LLP

(57) ABSTRACT

Techniques are provided for storage system interface discovery with a limited number of persistent host discovery connections. One method comprises receiving, by a receiving storage system interface of multiple storage system interfaces, a discovery connection request from a given host interface; transforming, by the receiving storage system interface, an identifier of a host device associated with the given host interface to obtain an identifier of a given storage system interface; determining, by the receiving storage system interface, whether the identifier of the given storage system interface identifies the receiving storage system interface; and in response to the identifier of the given storage system interface identifying the receiving storage system interface, the receiving storage system interface (i) provides a persistent discovery connection to the given host interface; and (ii) provides discovery information to the given host interface identifying a set of available storage system interfaces.

20 Claims, 7 Drawing Sheets

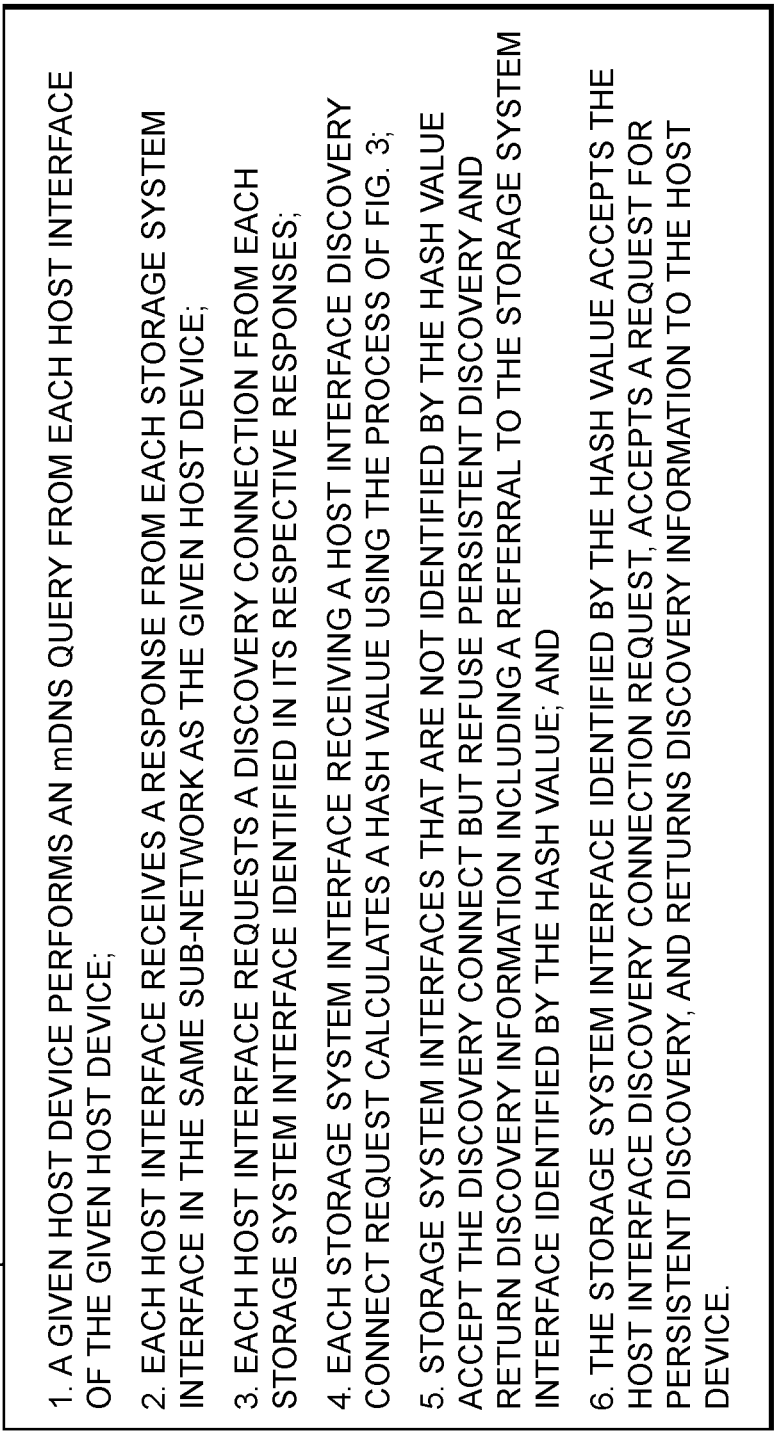

1. A GIVEN HOST DEVICE PERFORMS AN mDNS QUERY FROM EACH HOST INTERFACE OF THE GIVEN HOST DEVICE;

2. EACH HOST INTERFACE RECEIVES A RESPONSE FROM EACH STORAGE SYSTEM INTERFACE IN THE SAME SUB-NETWORK AS THE GIVEN HOST DEVICE;

3. EACH HOST INTERFACE REQUESTS A DISCOVERY CONNECTION FROM EACH STORAGE SYSTEM INTERFACE IDENTIFIED IN ITS RESPECTIVE RESPONSES;

4. EACH STORAGE SYSTEM INTERFACE RECEIVING A HOST INTERFACE DISCOVERY CONNECT REQUEST CALCULATES A HASH VALUE USING THE PROCESS OF FIG. 3;

5. STORAGE SYSTEM INTERFACES THAT ARE NOT IDENTIFIED BY THE HASH VALUE ACCEPT THE DISCOVERY CONNECT BUT REFUSE PERSISTENT DISCOVERY AND RETURN DISCOVERY INFORMATION INCLUDING A REFERRAL TO THE STORAGE SYSTEM INTERFACE IDENTIFIED BY THE HASH VALUE; AND

6. THE STORAGE SYSTEM INTERFACE IDENTIFIED BY THE HASH VALUE ACCEPTS THE HOST INTERFACE DISCOVERY CONNECTION REQUEST, ACCEPTS A REQUEST FOR PERSISTENT DISCOVERY, AND RETURNS DISCOVERY INFORMATION TO THE HOST DEVICE.

STORAGE SYSTEM INTERFACE DISCOVERY WITH LIMITED NUMBER OF PERSISTENT HOST DISCOVERY CONNECTIONS

FIELD

The field relates generally to information processing systems, and more particularly to storage in such systems.

BACKGROUND

A host device often has multiple host interfaces that can connect to multiple storage system interfaces of a storage system. Each host interface may identify each accessible storage system interface using an automated discovery process, whereby a given host interface may connect to a set of accessible storage system interfaces to perform storage system interface discovery. When the host device and the storage system support persistent discovery, multiple persistent discovery connections may be established between the host device and the storage system. The multiple persistent discovery connections may result in the host device receiving duplicate discovery information. In addition, the number of persistent discovery connections that the host device and the storage system must support may grow over time to be quite large.

A need exists for improved techniques for performing discovery of the storage system interfaces available to a host device.

SUMMARY

In one embodiment, a method comprises receiving, by a receiving storage system interface of a storage system comprising a plurality of storage system interfaces, a discovery connection request from a given host interface; transforming, by the receiving storage system interface, an identifier of a host device associated with the given host interface to obtain an identifier of a given one of the plurality of storage system interfaces; determining, by the receiving storage system interface, whether the identifier of the given one of the plurality of storage system interfaces identifies the receiving storage system interface; and in response to the identifier of the given one of the plurality of storage system interfaces identifying the receiving storage system interface, the receiving storage system interface performs the following steps: providing a persistent discovery connection to the given host interface; and providing discovery information to the given host interface identifying a set of available storage system interfaces.

In one or more embodiments, the transforming comprises applying a hash function to the identifier of the host device to obtain the identifier of the given one of the plurality of storage system interfaces. The transforming may comprise selecting the given one of the plurality of storage system interfaces in a manner that distributes a load among the plurality of storage system interfaces.

In some embodiments, one or more of the plurality of storage system interfaces that are not identified by the identifier of the given one of the plurality of storage system interfaces do not provide a persistent discovery connection to the given host interface. In addition, one or more of the plurality of storage system interfaces that are not identified by the identifier of the given one of the plurality of storage system interfaces may provide discovery information to the given host interface comprising a referral to the identified given one of the plurality of storage system interfaces.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for a process for persistent storage system interface discovery, according to one embodiment of the disclosure;

DETAILED DESCRIPTION

Figure 1:
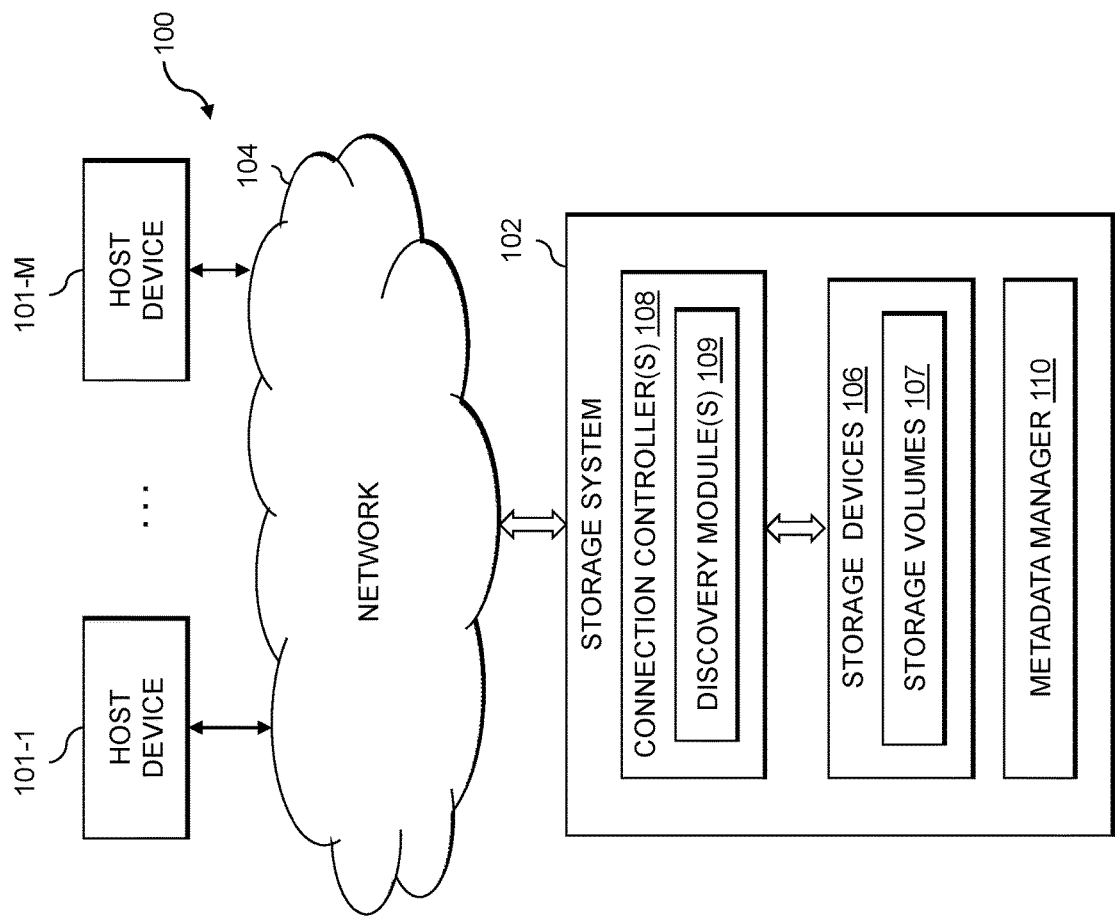
FIG. 1 illustrates an information processing system configured for storage system interface discovery with a limited number of persistent host discovery connections in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for storage system interface discovery with a limited number of persistent host discovery connections.

A number of discovery protocols that provide a discovery service are available that allow a host device to automatically discover the storage system interfaces that the host device may connect with. For example, the NVM Express over Fabrics (NVMe-oF) specification defines a persistent discovery connection that allows the storage system to notify the host device about updates to the previously reported discovery information and that allows the host device to automatically receive the updated information.

The NVMe-oF specification further defines a multicast Domain Name System (mDNS)/DNS Service Discovery (DNS-SD) method that allows a host device to automatically discover an initial storage system interface that the host device can connect to in order to perform storage system interface discovery. In a configuration where the host device and the storage system employ the mDNS/DNS-SD method, it is expected that each host interface will identify each accessible storage system interface and a given host interface typically connects to all of the accessible storage system interfaces to perform discovery. As noted above, when the host device and the storage system support persistent discovery, the discovery connections will be persistent, often resulting in the host device receiving duplicate discovery information from multiple persistent discovery connections (and the host device must typically merge the duplicate discovery information). While one or more embodiments of the disclosure are described herein using the mDNS discovery aspects of the NVMe-oF specification, other discovery protocols and processes may be employed, as would be apparent to a person of ordinary skill in the art.

In addition, the number of persistent discovery connections that the host device and the storage system must support is typically quite large. The automatic nature of the discovery often means that a given host device will connect to the accessible storage system interfaces that provide a discovery service, including those storage system interfaces that do not expose any storage volumes for the given host device. In a large data center, for example, where the network is not strictly partitioned, this may lead to a very large number of discovery connections, without providing additional discovery information to the host device.

In one or more embodiments, techniques are provided for storage system interface discovery with a limited number of persistent host discovery connections. In at least some embodiments, the disclosed persistent storage system interface discovery techniques limit a number of persistent host discovery connections by selecting a single storage system interface for each set of storage system interfaces that are accessible to the host interface requesting the discovery connection (e.g., within a sub-network) and for each host device, and the remaining storage system interfaces provide a reference to the selected storage system interface.

FIG. 1 shows an information processing system 100 configured in accordance with an illustrative embodiment. The information processing system 100 comprises a plurality of host devices 101-1 through 101-M, collectively referred to herein as host devices 101 (e.g., host servers). The host devices 101 are configured to communicate with a storage system 102 over a network 104.

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate IO operations that are processed by the storage system 102. The term "input-output" as used herein refers to at least one of input and output. For example, IO operations may comprise write requests and/or read requests directed to logical addresses of a particular logical storage volume of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of a cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106, one or more connection controllers 108 and a metadata manager 110. In at least some embodiments, each connection controller 108 is unique to a host device 101 and describes a unique connection of the host device 101 to the storage system 102. In one or more embodiments, each connection controller 108 comprises (or is associated with) a discovery module 109 that implements at least portions of the disclosed techniques for persistent storage system interface discovery, as discussed further below in conjunction with FIGS. 3 through 5, for example. The metadata manager 110 may be implemented, for example, as a software object that manages the storage system 102. The metadata manager 110 may implement at least some of the disclosed functionality for persistent storage system interface discovery, as discussed further below in conjunction with, for example, FIG. 3.

The storage devices 106 store data of a plurality of storage volumes 107. For example, the storage volumes 107 may illustratively comprise respective logical units (LUNs) or other types of logical storage volumes. It is noted that in the context of a Linux/Unix system, a volume relates to a Logical Volume Manager (LVM), which can be used to manage mass storage devices; a physical volume generally refers to a storage device or partition; and a logical volume is created by the LVM and is a logical storage device (e.g., a LUN) which can span multiple physical volumes. The term "storage volume" as used herein is intended to be broadly construed, and shall encompass, for example, a virtual disk, other units of data storage, a logical storage volume, and a namespace, and should not be viewed as being limited to any particular format or configuration.

The storage devices 106 of the storage system 102 illustratively comprise solid state drives (SSDs). Such SSDs are implemented using NVM devices such as flash memory. Other types of NVM devices that can be used to implement at least a portion of the storage devices include non-volatile random-access memory (NVRAM), phase-change RAM (PC-RAM), magnetic RAM (MRAM), resistive RAM, and spin torque transfer magneto-resistive RAM (STT-MRAM). These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives, storage appliances or other types of storage devices.

In some embodiments, the storage system 102 illustratively comprises a scale-out all-flash distributed content addressable storage (CAS) system, such as a storage array. A wide variety of other types of distributed or non-distributed storage arrays can be used in implementing the storage system 102 in other embodiments. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as NAS, storage area networks (SANs), direct-attached storage (DAS) and distributed DAS, as well as combinations of these and other storage types, including software-defined storage.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The MPIO driver may comprise, for example, an otherwise conventional MPIO driver. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

In some embodiments, the storage system 102 is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller of the storage system 102. For example, in some embodiments the sets of processing modules of the storage nodes collectively comprise a distributed storage controller of the storage system 102. A "distributed storage system" as that term is broadly used herein is intended to encompass any storage system that is distributed across multiple storage nodes.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102, or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers.

Additional examples of processing platforms utilized to implement host devices 101 and storage system 102 in illustrative embodiments will be described in more detail below in conjunction with FIGS. 6 and 7.

It is to be appreciated that these and other features of illustrative embodiments are presented by way of example only, and should not be construed as limiting in any way. For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Accordingly, different numbers, types and arrangements of system components such as host devices 101, storage system 102, and network 104 can be used in other embodiments.

It should be understood that the particular sets of components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
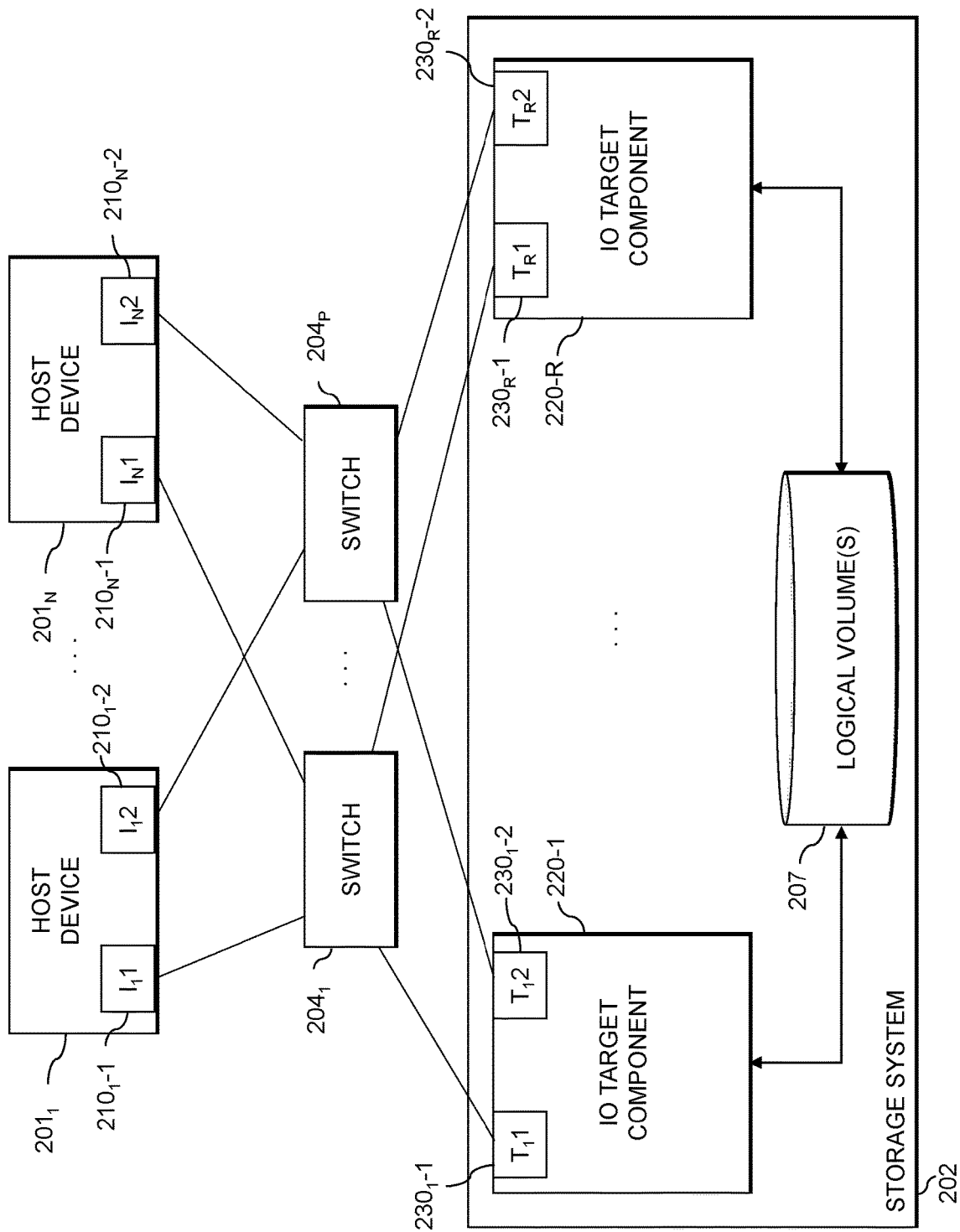
FIG. 2 is a block diagram illustrating switches that connect between host devices and components of the storage system of FIG. 1 in one illustrative embodiment.

FIG. 2 is a block diagram illustrating switches $204_1$ through $204^P$ that connect between host devices $201_1$ through $201_N$ and IO target components 220-1 through 220-R (e.g., storage data targets) of a storage system 202 in one or more illustrative embodiments.

Each of the host devices 201 illustratively has one or more IO paths to the storage system 202 using one or more of the switches $204_1$ through $204^P$, with at least one of the storage devices 106 of the storage system 202 being visible to that host device 201 on a given one of the paths. A given one of the storage devices 106 (e.g., logical volumes 207) may be accessible to the given host device 201 over one or more IO paths.

In illustrative embodiments, with reference to the example of FIG. 2, each of the host devices $201_1$ through $201_N$ comprises one or more initiator ports 210, e.g., initiator ports $210_1$-1, $210_1$-2, $210_N$-1 and $210_N$-2, also sometimes referred to herein a host interfaces, which are utilized to communicate with the storage system 202 via one or more switches $204_1$ through $204_P$. In some embodiments, the initiator ports 210 are referred to as initiators for the IO paths. For example, the initiator port $210_1$-1 of host device $201_1$ may be referred to as initiator 1 ($I_1$1) and the initiator port $210_1$-2 of host device $201_1$ may be referred to as initiator 2 ($I_1$2). Initiator ports 210 may comprise any circuitry that is configured to enable communication between the host devices 201 and the storage system 202 or any other devices.

In addition, with continued reference to the example of FIG. 2, each of the IO target components 220-1 through 220-R provides IO target functionality and comprises one or more target ports 230, e.g., target ports $230_1$-1, $230_1$-2, $230_R$-1 and $230_R$-2, also sometimes referred to herein a storage system interfaces, which are utilized to communicate with one or more host devices 201 via the one or more switches $204_1$ through $204_P$. In some embodiments, the target ports 230 are referred to as targets for the IO paths. For example, the target port $230_1$-1 of IO target component 220-1 may be referred to as target 1 ($T_1$1) and the target port $230_1$-2 of IO target component 220-1 may be referred to as target 2 ($T_1$2). Target ports 230 may comprise any circuitry that is configured to enable communication between the host devices 201 and the storage system 202 or any other devices.

In the example of FIG. 2, each IO target component 220 is associated with (e.g., serves) one or more target ports 230 and therefore the selection of a target port 230 also selects the IO target component 220 associated with the selected target port 230.

As noted above, in some embodiments, storage system interface discovery is performed by the discovery modules 109 associated with the available storage system interfaces (e.g., target ports 230), such that a particular discovery module 109 associated with a given one of the storage system interfaces selects the given one storage system interface for a particular sub-network and for each host device, and the discovery modules 109 associated with the remaining storage system interfaces provide a reference to the selected storage system interface. The term "path," as used herein, comprises a connection between a host initiator port 210, and a target port 230, through which a given host device 201 can access a specific storage volume (or LUN).

Figure 3:
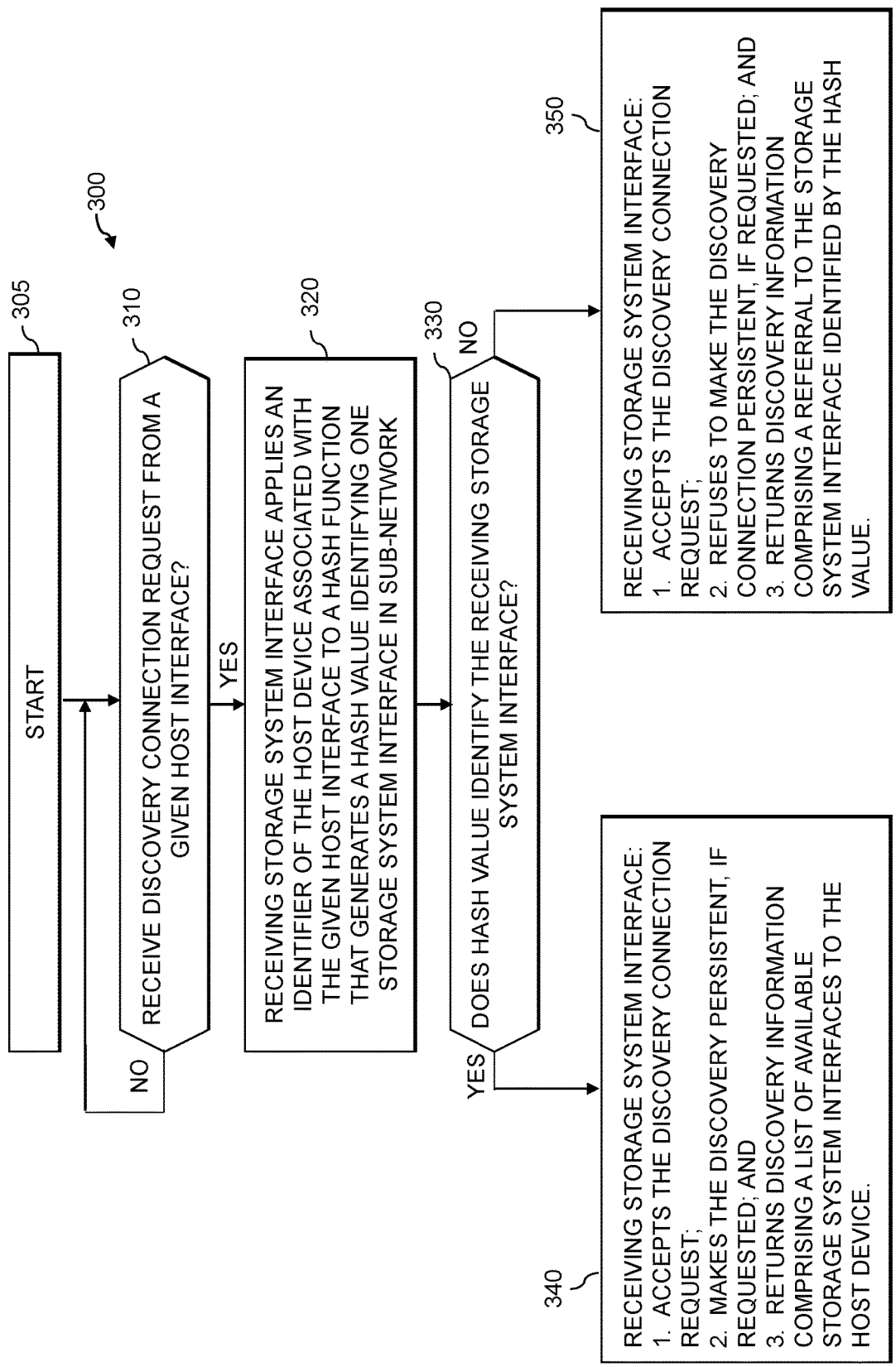
FIG. 3 is a flow diagram illustrating an exemplary implementation of a process for processing discovery connection requests from a host device, according to one embodiment of the disclosure.

FIG. 3 is a flow diagram illustrating an exemplary implementation of a process 300 for processing discovery connection requests from a host device, according to one embodiment of the disclosure. In the example of FIG. 3, the process 300 is initiated in step 305 when a receiving storage system interface detects receipt of a discovery connection request from a given host interface in step 310. The receiving storage system interface then applies an identifier of the host device associated with the given host interface in step 320 to a hash function (or another transformation function) that generates a hash value identifying one storage system interface in the same sub-network as the receiving storage system interface.

For example, in other embodiments, the transformation function may comprise the receiving storage system interface providing the identifier of the host device associated with the given host interface (or an identifier of the given host interface) to a metadata management unit (or another component) in the storage system that maps the host identifier to a particular storage system interface using logic (e.g., round-robin logic), where each host device that connects for discovery is mapped to the next available storage system interface, for example (e.g., when the host device connects, or when the host device is configured).

In at least one embodiment, the host interfaces and the storage system interfaces in the same sub-network can communicate with each other. If a given interface can connect to one interface in the sub-network, then the given interface can connect to all interfaces in the sub-network. Thus, if the hash value identifies a given storage system interface in the same sub-network and the host device is referred to the given storage system interface, the host device can connect to the given storage system interface.

In some embodiments, the identifier of the host device associated with the given host interface may comprise a host NVMe Qualified Name (e.g., a host NQN) identifier or another unique host identifier that is provided with the host connect request. The NQN format is specified in the NVMe specification.

In one or more embodiments, the hash function maps to one storage system interface that belongs to a set of storage system interfaces within the same sub-network as the receiving storage system interface, expressed as follows:

$H$(Host NQN)→storage system interface∈{storage system interfaces|subnet(storage system interface)=subnet(receiving storage system interface)}.

In addition, in at least some embodiments, the hash function should distribute the persistent discovery connections from the host devices over the available storage system interfaces in the sub-network.

A test is performed in step 330 to determine if the hash value identifies the receiving storage system interface. If it is determined in step 330 that the hash value does identify the receiving storage system interface, then the receiving storage system interface, in step 340: (i) accepts the discovery connection request; (ii) makes the discovery persistent, if requested; and (iii) returns discovery information comprising a list of available storage system interfaces to the host device.

If it is determined in step 330 that the hash value does not identify the receiving storage system interface, then the receiving storage system interface, in step 350: (i) accepts the discovery connection request; (ii) refuses to make the discovery connection persistent, if requested (e.g., by providing only a transient discovery connection); and (iii) returns discovery information comprising a referral to the storage system interface identified by the hash value (where the host device should go for a persistent discovery connection). In this manner, most of the responding storage system interfaces provide a referral, and only a small number of the storage system interfaces allow a persistent connection and return actual discovery information.

FIG. 4 illustrates exemplary pseudo code for a process 400 for storage system interface discovery with a limited number of persistent host discovery connections, according to one embodiment of the disclosure. In the exemplary process 400 of FIG. 4, a given host device performs an mDNS query in step 1 from each host interface of the given host device. In step 2, each host interface receives a response from each storage system interface in the same sub-network as the given host device. Generally, when a host device performs an mDNS query and gets a list of many discovery services associated with respective storage system interfaces, the host device attempts to connect to all of the listed storage system interfaces.

Each host interface requests a discovery connection in step 3 from each storage system interface identified in the responses, and each storage system interface receiving a host interface discovery connect request calculates a hash value in step 4 using the process 300 of FIG. 3.

The storage system interfaces that are not identified by the hash value accept the discovery connect request in step 5 but refuse a persistent discovery connection and return discovery information including a referral to the storage system interface identified by the hash value.

In step 6, the storage system interface identified by the hash value accepts the host interface discovery connection request, accepts a request for persistent discovery, and returns discovery information (e.g., a list of available storage system interfaces) to the host device.

The mDNS query performed in step 1 is an example of a storage system interface discovery process performed by a host device to identify the storage system interfaces that are available in the storage system. In another embodiment, the storage system interface discovery process may comprise manually configuring the host interface to interact with a given storage system interface to obtain the discovery information.

Figure 5:
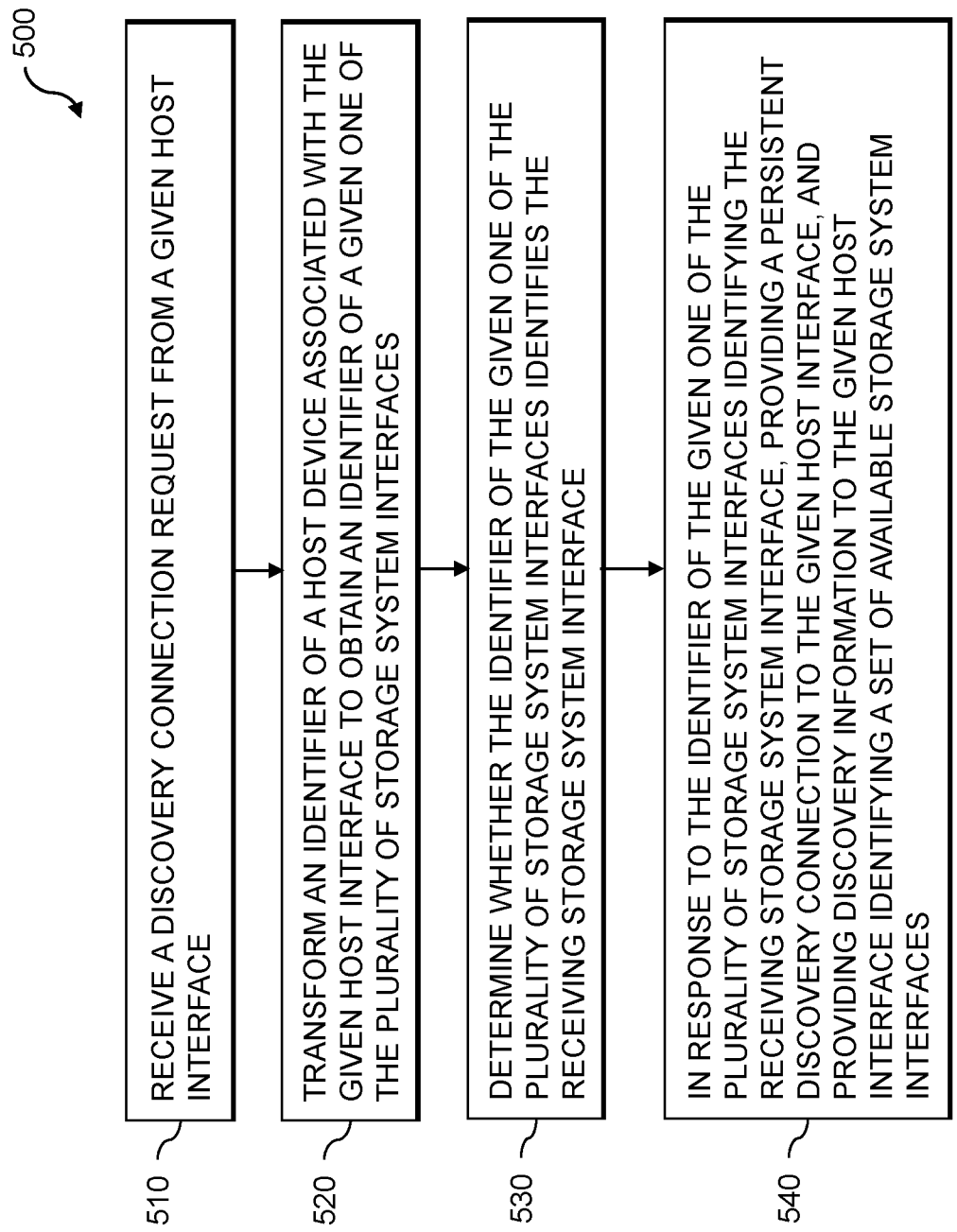
FIG. 5 is a flow diagram illustrating an exemplary implementation of a process for storage system interface discovery with a limited number of persistent host discovery connections, according to one exemplary embodiment.

FIG. 5 is a flow diagram illustrating an exemplary implementation of a process for storage system interface discovery with a limited number of persistent host discovery connections, according to one exemplary embodiment. In the example of FIG. 5, the exemplary process 500 initially receives, by a receiving storage system interface of a storage system comprising a plurality of storage system interfaces, a discovery connection request in step 510 from a given host interface.

The receiving storage system interface then transforms an identifier of the given host interface in step 520 to obtain an identifier of a given one of the plurality of storage system interfaces. In step 530, the receiving storage system interface then determines whether the identifier of the given one of the plurality of storage system interfaces identifies the receiving storage system interface.

In response to the identifier of the given one of the plurality of storage system interfaces identifying the receiving storage system interface, the receiving storage system interface performs the following steps in step 540:
providing a persistent discovery connection to the given host interface; and
providing discovery information to the given host interface identifying a set of available storage system interfaces.

In some embodiments, the transforming comprises applying a hash function to the identifier of the host device associated with the given host interface to obtain the identifier of the given one of the plurality of storage system interfaces. In addition, the transforming may comprise selecting the given one of the plurality of storage system interfaces in a manner that distributes a load among the plurality of storage system interfaces. The plurality of storage system interfaces may be on a same sub-network as the given host interface.

In one or more embodiments, one or more of the plurality of storage system interfaces that are not identified by the identifier of the given one of the plurality of storage system interfaces do not provide a persistent discovery connection to the given host interface. In addition, one or more of the plurality of storage system interfaces that are not identified by the identifier of the given one of the plurality of storage system interfaces may provide discovery information to the given host interface comprising a referral to the identified given one of the plurality of storage system interfaces.

The given host interface may perform a storage system interface discovery process, such as sending an mDNS query to the storage system, and may receive a response from a plurality of the storage system interfaces. The given host interface may then send a discovery connection request to each of the plurality of the storage system interfaces that sent a response.

The particular processing operations and other network functionality described in conjunction with the flow diagrams of FIGS. 3 and 5 and the pseudo code of FIG. 4 are presented by way of illustrative example only, and should not be construed as limiting the scope of the disclosure in any way. Alternative embodiments can use other types of processing operations to perform storage system interface discovery with a limited number of persistent host discovery connections. For example, the ordering of the process steps may be varied in other embodiments, or certain steps may be performed concurrently with one another rather than serially. In one aspect, the process can skip one or more of the actions. In other aspects, one or more of the actions are performed simultaneously. The processing of one or more of the actions can also be distributed between multiple components. In some aspects, additional actions can be performed.

In some embodiments, the disclosed techniques for persistent storage system interface discovery reduce the number of persistent discovery controllers that must be supported by the host device and the storage system in a sub-network. In addition, the amount of duplicate discovery information that is received by the host device is similarly reduced.

In one or more embodiments, where the hashed storage system interface is in the same sub-network as the storage system interface that received the host interface connection request, the selected storage system interface is accessible to the host interface.

Further, the number of persistent discovery connections that a host interface may have with a storage system is limited to one persistent discovery connection per sub-network, in at least some embodiments. In an L2 (Layer 2) network, for example, a host interface can access a single storage sub-network, meaning that each host interface has one persistent discovery connection to the storage system. In an L3 (Layer 3) network, it is possible that a host interface has a routed connection to multiple storage sub-networks, but this is not a common configuration. In most cases, the host interface will be routed to a single storage sub-network (and even in unlikely cases, it will be routed to a very small number of storage sub-networks).

In one or more embodiments, a given host device may implement logic to avoid connecting for discovery through multiple host ports to the same storage system interface.

Among other benefits, the storage system and the host devices only need to support a smaller number of discovery connections, relative to existing discovery techniques, such as manual discovery techniques. In addition, scalability is improved in one or more embodiments by reducing host connections to discovery services that will return duplicate discovery information, to thereby reduce the number of persistent discovery connections that must be maintained, and reduce the duplicate information returned to the host device. In at least some embodiments, a host device receives either unique discovery information through its discovery connection, or a reduced amount of duplicate information that can be more easily merged. In addition, a central control entity is not needed in the load-balancing mechanism, thereby reducing bottlenecks and improving resiliency to DOS (denial of service) attacks.

In some embodiments, in response to updates to the discovery information, the storage system only sends the updated information through a small number of persistent discovery controllers, and the host device only receives and handles the information through a small number of connections.

One or more embodiments of the disclosure provide improved methods, apparatus and computer program products for storage system interface discovery with a limited number of persistent host discovery connections. The foregoing applications and associated embodiments should be considered as illustrative only, and numerous other embodiments can be configured using the techniques disclosed herein, in a wide variety of different applications.

It should also be understood that the disclosed persistent storage system interface discovery techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for storage system interface discovery with a limited number of persistent host discovery connections may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based persistent storage system interface discovery engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based persistent storage system interface discovery platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
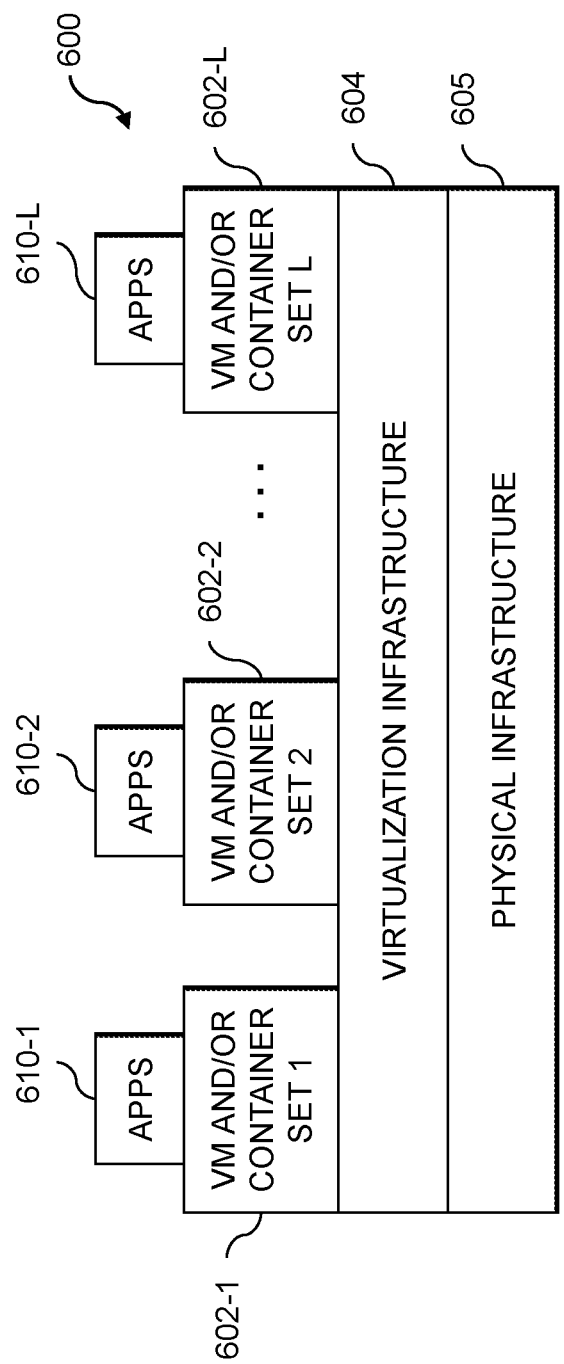
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide persistent storage system interface discovery functionality of the type described above for one or more processes running on a given one of the VMs. For example, each of the VMs can implement persistent storage system interface discovery control logic and associated management of load balancing for providing persistent storage system interface discovery functionality for one or more processes running on that particular VM.

An example of a hypervisor platform that may be used to implement a hypervisor within the virtualization infrastructure 604 is a compute virtualization platform which may have an associated virtual infrastructure management system such as server management software. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide persistent storage system interface discovery functionality of the type described above for one or more processes running on different ones of the containers. For example, a container host device supporting multiple containers of one or more container sets can implement one or more instances of persistent storage system interface discovery control logic and associated management of load balancing for providing persistent storage system interface discovery functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712.

The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
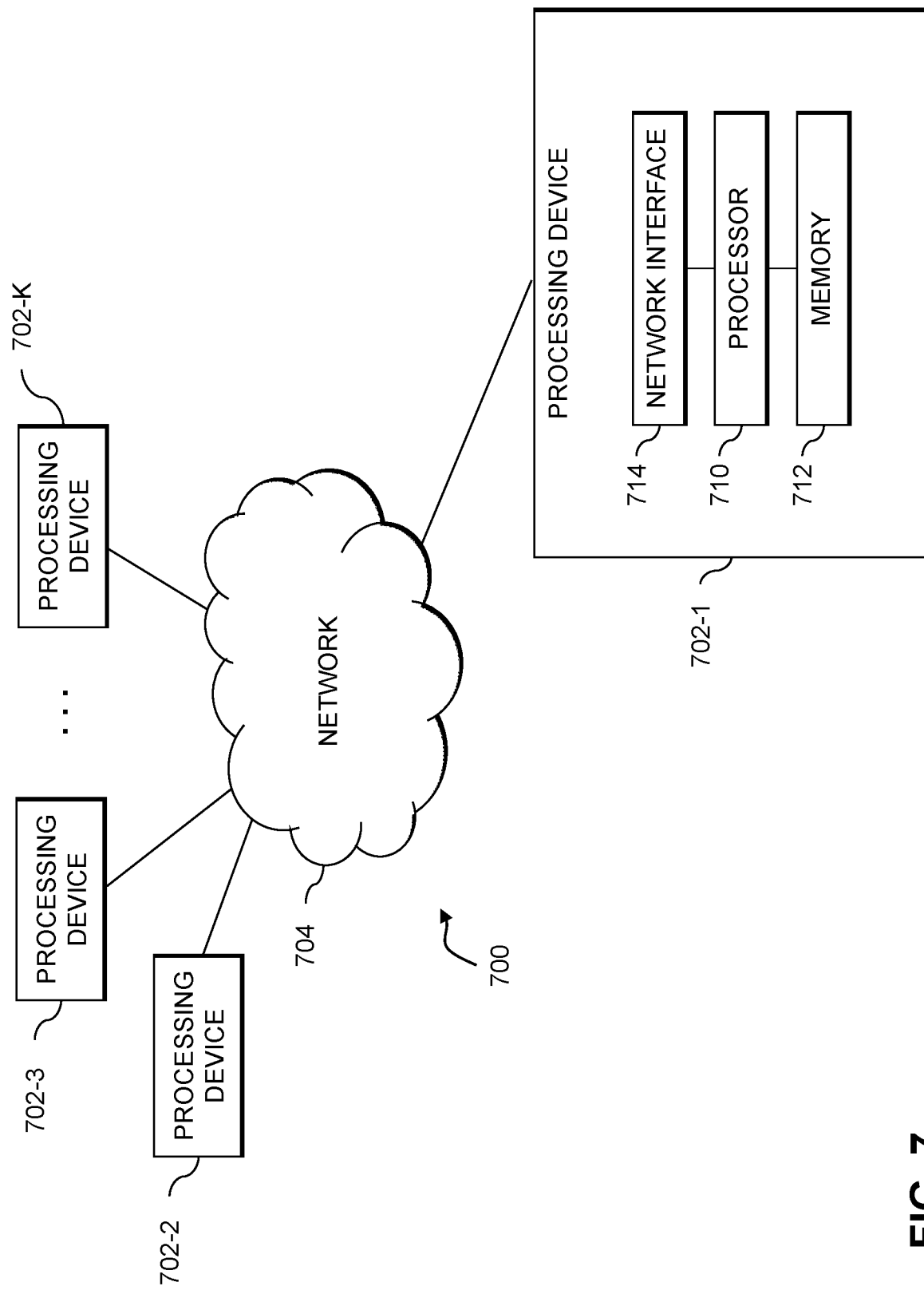
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving, by a receiving storage system interface of a storage system comprising a plurality of storage system interfaces, a discovery connection request from a given host interface;
transforming, by the receiving storage system interface, an identifier of a host device associated with the given host interface to obtain an identifier of a given one of the plurality of storage system interfaces;
determining, by the receiving storage system interface, that the identifier of the given one of the plurality of storage system interfaces identifies the receiving storage system interface; and
in response to the identifier of the given one of the plurality of storage system interfaces identifying the receiving storage system interface, the receiving storage system interface performs the following steps:
providing a persistent discovery connection to the given host interface; and
providing discovery information to the given host interface identifying a set of available storage system interfaces;
wherein the method is performed by at least one processing device comprising a processor coupled to a memory.

2. The method of claim 1, wherein the transforming comprises applying a hash function to the identifier of the host device to obtain the identifier of the given one of the plurality of storage system interfaces.

3. The method of claim 1, wherein the transforming comprises selecting the given one of the plurality of storage system interfaces in a manner that distributes a load among the plurality of storage system interfaces.

4. The method of claim 1, wherein the plurality of storage system interfaces comprises a set of storage system interfaces that are accessible to the given host interface.

5. The method of claim 1, wherein one or more of the plurality of storage system interfaces that are not identified by the identifier of the given one of the plurality of storage system interfaces do not provide a persistent discovery connection to the given host interface.

6. The method of claim 1, wherein one or more of the plurality of storage system interfaces that are not identified by the identifier of the given one of the plurality of storage system interfaces provide discovery information to the given host interface comprising a referral to the identified given one of the plurality of storage system interfaces.

7. The method of claim 1, wherein the received discovery connection request from the given host interface is part of a storage system interface discovery process that comprises the given host interface receiving a response from a plurality of the storage system interfaces and the given host interface sending a discovery connection request to each of the plurality of the storage system interfaces that sent a response.

8. The method of claim 1, wherein the steps performed in response to the identifier of the given one of the plurality of storage system interfaces identifying the receiving storage system interface further comprise accepting the discovery connection request from the given host interface.

9. An apparatus comprising:
at least one processing device comprising a processor coupled to a memory;
the at least one processing device being configured to implement the following steps:
receiving, by a receiving storage system interface of a storage system comprising a plurality of storage system interfaces, a discovery connection request from a given host interface;
transforming, by the receiving storage system interface, an identifier of a host device associated with the given host interface to obtain an identifier of a given one of the plurality of storage system interfaces;
determining, by the receiving storage system interface, whether the identifier of the given one of the plurality of storage system interfaces identifies the receiving storage system interface; and
in response to the identifier of the given one of the plurality of storage system interfaces identifying the receiving storage system interface, the receiving storage system interface performs the following steps:
providing a persistent discovery connection to the given host interface; and
providing discovery information to the given host interface identifying a set of available storage system interfaces.

10. The apparatus of claim 9, wherein the transforming comprises applying a hash function to the identifier of the host device to obtain the identifier of the given one of the plurality of storage system interfaces.

11. The apparatus of claim 9, wherein the transforming comprises selecting the given one of the plurality of storage system interfaces in a manner that distributes a load among the plurality of storage system interfaces.

12. The apparatus of claim 9, wherein one or more of the plurality of storage system interfaces that are not identified by the identifier of the given one of the plurality of storage system interfaces do not provide a persistent discovery connection to the given host interface.

13. The apparatus of claim 9, wherein one or more of the plurality of storage system interfaces that are not identified by the identifier of the given one of the plurality of storage system interfaces provide discovery information to the given host interface comprising a referral to the identified given one of the plurality of storage system interfaces.

14. The apparatus of claim 9, wherein the received discovery connection request from the given host interface is part of a storage system interface discovery process that comprises the given host interface receiving a response from a plurality of the storage system interfaces and the given host interface sending a discovery connection request to each of the plurality of the storage system interfaces that sent a response.

15. A non-transitory processor-readable storage medium having stored therein program code of one or more software programs, wherein the program code when executed by at least one processing device causes the at least one processing device to perform the following steps:
- receiving, by a receiving storage system interface of a storage system comprising a plurality of storage system interfaces, a discovery connection request from a given host interface;
- transforming, by the receiving storage system interface, an identifier of a host device associated with the given host interface to obtain an identifier of a given one of the plurality of storage system interfaces;
- determining, by the receiving storage system interface, whether the identifier of the given one of the plurality of storage system interfaces identifies the receiving storage system interface; and
- in response to the identifier of the given one of the plurality of storage system interfaces identifying the receiving storage system interface, the receiving storage system interface performs the following steps:
  - providing a persistent discovery connection to the given host interface; and
  - providing discovery information to the given host interface identifying a set of available storage system interfaces.

16. The non-transitory processor-readable storage medium of claim 15, wherein the transforming comprises applying a hash function to the identifier of the host device to obtain the identifier of the given one of the plurality of storage system interfaces.

17. The non-transitory processor-readable storage medium of claim 15, wherein the transforming comprises selecting the given one of the plurality of storage system interfaces in a manner that distributes a load among the plurality of storage system interfaces.

18. The non-transitory processor-readable storage medium of claim 15, wherein one or more of the plurality of storage system interfaces that are not identified by the identifier of the given one of the plurality of storage system interfaces do not provide a persistent discovery connection to the given host interface.

19. The non-transitory processor-readable storage medium of claim 15, wherein one or more of the plurality of storage system interfaces that are not identified by the identifier of the given one of the plurality of storage system interfaces provide discovery information to the given host interface comprising a referral to the identified given one of the plurality of storage system interfaces.

20. The non-transitory processor-readable storage medium of claim 15, wherein the received discovery connection request from the given host interface is part of a storage system interface discovery process that comprises the given host interface receiving a response from a plurality of the storage system interfaces and the given host interface sending a discovery connection request to each of the plurality of the storage system interfaces that sent a response.

\* \* \* \* \*